US009589321B2

(12) United States Patent
Hume et al.

(10) Patent No.: US 9,589,321 B2
(45) Date of Patent: Mar. 7, 2017

(54) SYSTEMS AND METHODS FOR ANIMATING A VIEW OF A COMPOSITE IMAGE

(71) Applicant: Google Inc., Mountain View, CA (US)

(72) Inventors: Thomas Weedon Hume, Mountain View, CA (US); Mikkel Crone Köser, Copenhagen (DK)

(73) Assignee: Google Inc., Mountain View, CA (US)

( * ) Notice: Subject to any disclaimer, the term of this patent is extended or adjusted under 35 U.S.C. 154(b) by 374 days.

(21) Appl. No.: 14/261,372

(22) Filed: Apr. 24, 2014

(65) Prior Publication Data

US 2015/0310583 A1 Oct. 29, 2015

(51) Int. Cl.
*G06T 3/40* (2006.01)
*G06T 13/80* (2011.01)
*G06T 3/20* (2006.01)
*G06F 3/0485* (2013.01)

(52) U.S. Cl.
CPC .............. *G06T 3/4038* (2013.01); *G06T 3/20* (2013.01); *G06T 13/80* (2013.01); *G06F 3/0485* (2013.01); *G06T 2207/20221* (2013.01)

(58) Field of Classification Search
CPC ................... G06T 13/80; G06T 3/4038; G06T 2207/20221; G06T 2207/2022; G06T 3/20; G06F 3/0485
See application file for complete search history.

(56) References Cited

U.S. PATENT DOCUMENTS

| 2007/0024722 | A1* | 2/2007 | Eura | G06F 17/30265 348/231.2 |
| 2008/0229235 | A1* | 9/2008 | Vau | G09G 5/346 715/784 |
| 2009/0022357 | A1* | 1/2009 | Katz | H04N 1/00198 382/100 |
| 2011/0181687 | A1* | 7/2011 | Yoshizumi | H04N 5/23238 348/36 |

(Continued)

OTHER PUBLICATIONS

"The American Heritage collage dictionary", Houghton Mifflin Company, 4th ed. 2002, p. 309.*

(Continued)

*Primary Examiner* — Michelle L Sams
(74) *Attorney, Agent, or Firm* — Troutman Sanders LLP; James E. Schutz; Brennan M. Carmody

(57) ABSTRACT

Techniques for animating a view of a composite image based on metadata related to the capture of the underlying source images. According to certain implementations, the metadata may include timing or sensor data collected or generated during capture of the component source images. For example, the timing data may indicate an order or sequence in which the source images were captured. Accordingly, the corresponding regions of the composite panoramic image may be panned to in sequence, for example, using the Ken Burns Effect. In another example, sensor data from gyroscopes or accelerometers may be used to simulate the movement of the image capture device used to generate the source images. In another implementation, the source (Continued)

301A  301B  301C  301D

310 images may be associated with varying focal lengths or zoom levels. Accordingly, certain implementations may vary a level zoom, based on the metadata, while panning between source photos.

20 Claims, 6 Drawing Sheets

(56) References Cited

U.S. PATENT DOCUMENTS

| | | | | |
|---|---|---|---|---|
| 2011/0235858 | A1* | 9/2011 | Hanson | G06F 17/3028 |
| | | | | 382/103 |
| 2012/0249575 | A1* | 10/2012 | Krolczyk | G06F 3/147 |
| | | | | 345/619 |
| 2013/0124951 | A1* | 5/2013 | Shechtman | G06T 13/80 |
| | | | | 715/201 |
| 2013/0250077 | A1* | 9/2013 | Kimura | H04N 9/80 |
| | | | | 348/61 |

OTHER PUBLICATIONS

Scott, Samuel James, "7 Tools You Should Be Using With the New iMovie Update", 4. Using the Ken Burns Effect with Panoramic Images, https://computers.tutsplus.com/tutorials/7-tools-you-should-be-using-with-the-new-imovie-update--mac-55790; Nov. 25, 2013.*

* cited by examiner

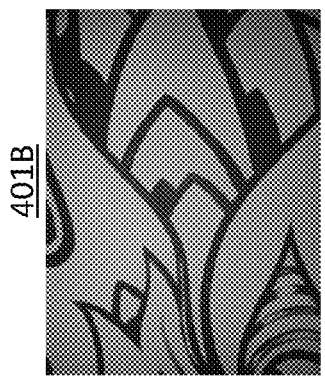
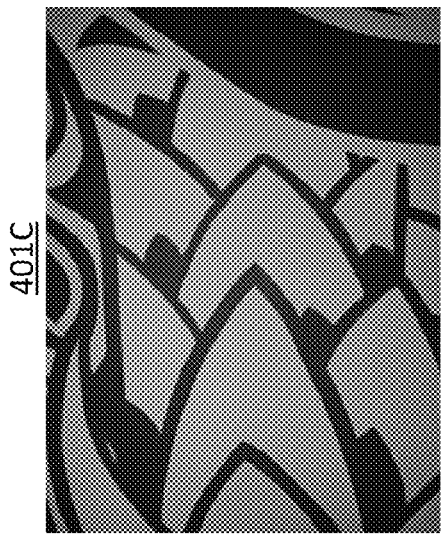
FIG. 4

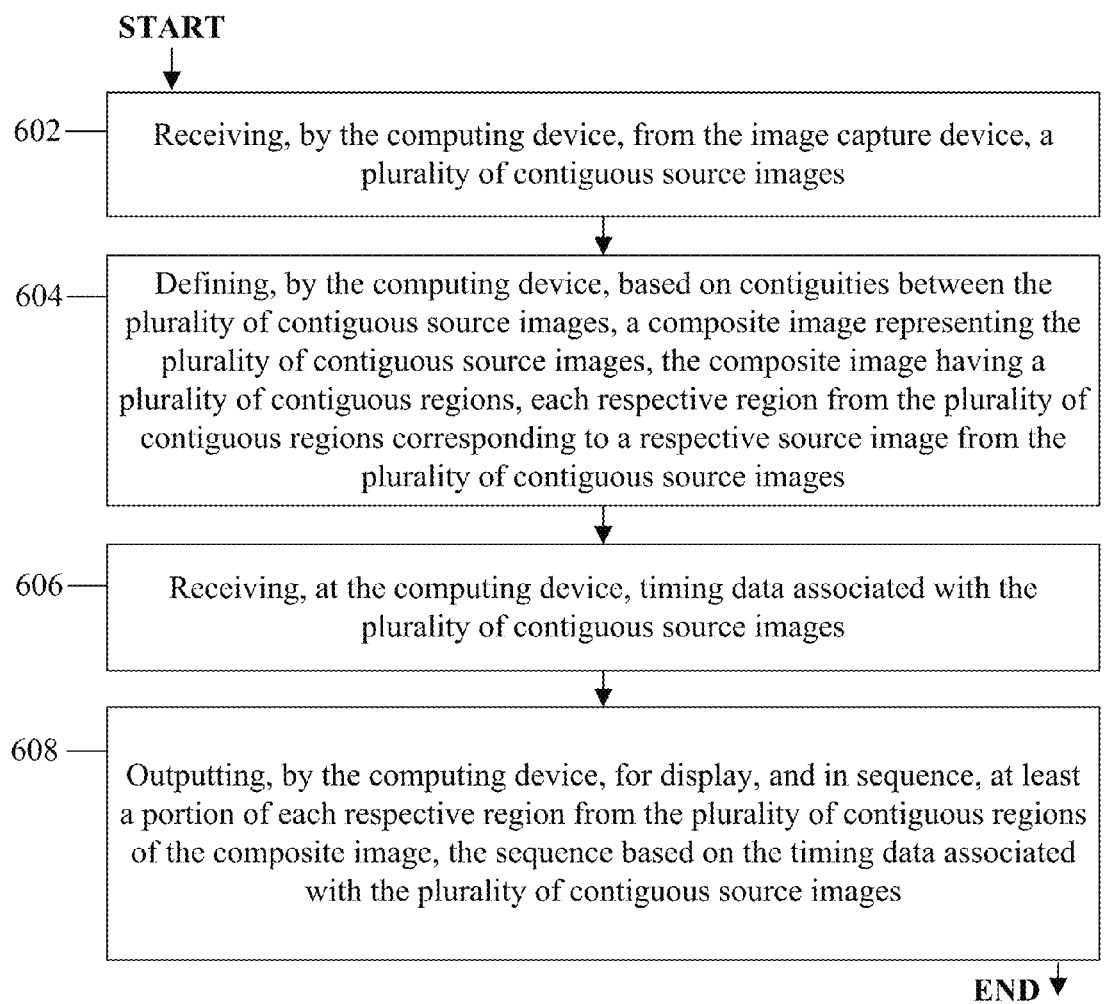

SYSTEMS AND METHODS FOR ANIMATING A VIEW OF A COMPOSITE IMAGE

BACKGROUND

Panoramic images, or panoramas, can provide a more immersive viewing experience by providing a wider field of view, or aspect ratio, than standard images. Conventional panoramic images can be captured with special wide-angle or panoramic lenses. However, panoramic images may also be created by assembling or "stitching" together contiguous images taken from standard lenses to form a composite image. The proliferation of consumer image capture devices (e.g., digital cameras) and recent developments in image processing software have placed the ability to create high-resolution composite panoramic images in the hands of casual photographers. Moreover, image capture devices and software suitable for creating such panoramas are becoming common on mobile computing devices (e.g., smartphones and tablets).

Unfortunately, the non-standard aspect ratios associated with panoramic images often make viewing a full panoramic image impractical on a display with a traditional pixel aspect ratio. A full view of a panorama, for example, may make use of only a limited portion of available display area due to "letterboxing." Moreover, a composite panorama may have a resolution greatly exceeding the native resolution of a display device, especially a display of a mobile computing device. Thus, a full view of a panoramic image may prevent finer details of the image from being visible. Accordingly, a user may instead opt to view a limited first portion of a panorama, and then pan or zoom to reveal other portions of the image in turn.

A known technique for gradually revealing an image by panning or zooming is known as the "Ken Burns Effect." However, while the Ken Burns Effect may provide an aesthetically pleasing way to view a panoramic image, conventional implementations are limited in applying the technique to a composite image without consideration of the source images used to create the composite image.

SUMMARY

Some or all of the above deficiencies may be addressed by certain implementations of the disclosed technology. Certain implementations include techniques for animating a view of a composite image based on metadata related to the capture of the underlying source images. Accordingly, implementations of the disclosed technology may enrich the viewing experience by mimicking the view of the photographer when the source images were being captured.

According to an example implementation, a method is provided. The method may include, receiving a composite image representing a plurality of source images. The composite image may have a plurality of contiguous regions with each respective region from the plurality of contiguous regions corresponding to a respective source image from the plurality of source images. The method may further include receiving timing data associated with the plurality of source images. The method may yet further include outputting, for display, and in sequence, at least a portion of each respective region from the plurality of contiguous regions of the composite image. The sequence may be based on the timing data associated with the plurality of source images.

According to a further implementation, the timing data may include an index associated with each source image from the plurality of source images. The sequence may be based on the index associated with each source image from the plurality of contiguous images. In a yet further implementation, the index associated with each respective source image from the plurality of source images may be based on a respective time of capture associated with the respective source image.

According to another further implementation, the method may include receiving the plurality of source images. These images may come from an image capture device. The method may further include defining the composite image based on contiguities between the plurality of source images.

According to another example implementation, a computer program product is provided. The computer program product may include a non-transitory computer readable medium. The computer readable medium may store instructions that, when executed by at least one processor in a system, cause the processor to perform a method substantially similar to the method described hereinabove.

According to yet another example implementation, a system is provided. The system may include an image capture device coupled to a computing device, and a memory operatively coupled to the computing device and configured for storing data and instructions that may be executed by the processor. When executed, the system may be caused to perform a method substantially similar to the method described hereinabove.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 4 depicts an illustration of three source images 401A-C associated with various focal lengths.

FIG. 6 is a flow diagram of another method 600 for animating a view of a composite image based on metadata related to the capture of the underlying source images.

DETAILED DESCRIPTION

Figure 1:
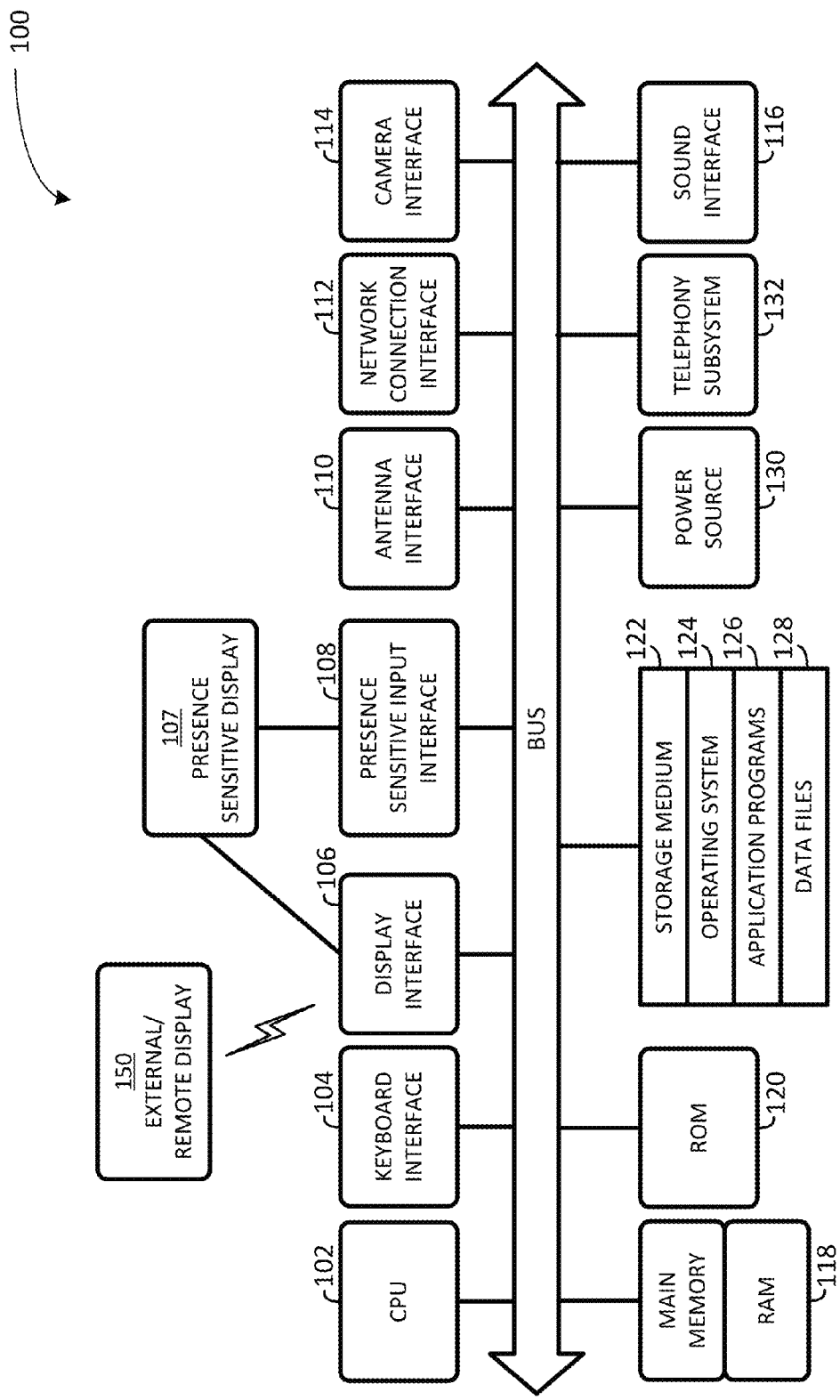
FIG. 1 depicts a block diagram of illustrative computing device architecture 100, according to an example implementation.

Implementations of the disclosed technology include techniques for animating a view of a composite image based on metadata related to the capture of the underlying source images. According to certain implementations, the metadata may include timing or sensor data recorded or generated during capture of the source images. In an example embodiment, the timing data may indicate an order or sequence in which the source images were captured, enabling corresponding regions of the composite panoramic image to be panned or zoomed to in sequence, for example, using the Ken Burns Effect. In another example, sensor data from gyroscopes or accelerometers may be used to tailor the panning or zooming to further mimic the operation of the image capture device during capture of the source images.

Some implementations of the disclosed technology will be described more fully hereinafter with reference to the accompanying drawings. The disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for animating a view of a composite image based on metadata related to the capture of the underlying source images, and will now be described with reference to the accompanying figures.

Figure 2:
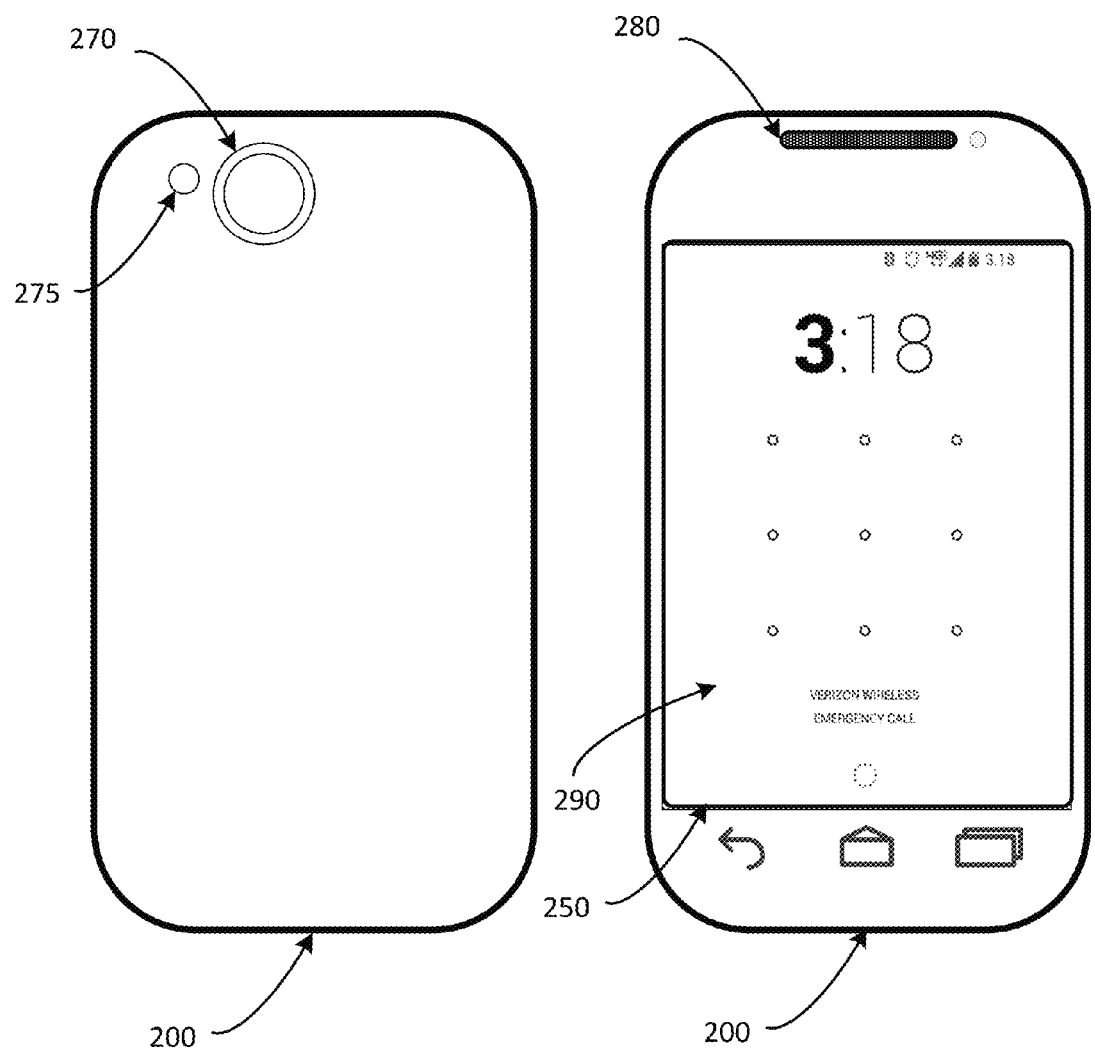
FIG. 2 depicts an illustration of a computing device 200, according to an example implementation.

FIG. 1 depicts a block diagram of illustrative computing device architecture 100, according to an example implementation. Certain aspects of FIG. 1 may be embodied in a computing device 200 (for example, a mobile computing device as shown in FIG. 2). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a computing device 200, according to an example implementation. As shown in FIG. 2, the computing device may be a mobile computing device, for example, a smartphone or a tablet. The mobile computing device may have a built-in or integrated display 250 for presenting a graphical user interface (GUI) 290 for viewing images or other media content. The display may be combined with a presence sensitive input device to form a touch-sensitive or presence-sensitive display for receiving user input from a stylus, finger, or other means of gesture input. In some implementations, the mobile computing device may also include or be associated with a sound producing device 280, such as a speaker, piezoelectric buzzer, or the like.

The mobile computing device 200 may be in communication with an image capture device 270 for capturing or recording content. As shown in FIG. 2, the computing device may include a built-in or internal image capture device, for example, a camera or CCD. The image capture device may include or be associated with an illumination device 275, for example, a flash device or IR beacon. In another example implementation, the image capture device may be external to the computing device and in communication with the computing device, for example, through a direct connection, or wireless coupling.

In certain implementations, the mobile computing device 200 may include one or more antennas or radios for wireless communication. These may include antennas for receiving GPS, Wi-Fi, or other radio communications. In addition, the mobile computing device may include one or more sensors for detecting, for example and without limitation, temperature, pressure, altitude, magnetic heading, etc.

Composite images based on multiple source images are often too large to effectively display in their entirety onscreen, especially on computing devices 200 with relatively smaller displays 250, such as smartphones and tablets. As a result, techniques have been developed to incrementally display the content of a composite image. One such technique is the "Ken Burns Effect."

The Ken Burns Effect is known in the art as a type of panning or zooming effect used to animate a view of still images in a movie. In film editing, the technique may be implemented using a rostrum camera. In modern applications, however, the Ken Burns Effect is typically added by software.

Applying the Ken Burns Effect generally involves displaying a view of a first limited portion an image, and automatically panning or zooming the view across the image in a single direction to reveal gradually additional portions of the image. Conventional software allows a user to indicate a direction of the panning or an amount of zoom, for example, by selecting an initial portion of the image and a final portion of the image to display. Some software further allows a user to select or chain multiple image portion transitions together to emphasize various portions of a composite image in sequence.

In contrast, implementations of the present disclosed technology include techniques for animating a view of a composite image based on metadata related to the capture of the underlying source images. By leveraging non-image data recorded or generated when the source images were captured, some implementations may provide a more immersive viewing experience by automatically animating a view of the composite image representing the source images in a manner that mimics the view of the image capture device while the source images were being captured—in effect, placing the viewer in the shoes of the photographer when the source images were taken.

According to certain implementations, a composite image may be created or defined based on a plurality of source images. For example, a composite panoramic image may incorporate image content from multiple source photos. In another example, a composite may incorporate image content from frames of a video feed. In some implementations, the source images may be combined, or "stitched" together, based on a determination of contiguous image content, herein referred to as "contiguity" or "overlap," between the images. Techniques for generating composite images from source images are known in the art and not discussed at length herein.

According to certain implementations, a source image may be associated with metadata related to the capture of the source image. In some implementations, the metadata may be recorded or generated during capture of the source image. For example, the metadata may include timing data associated with the capture of a photo. In some implementations, the timing data may correspond to an absolute date or time. In another implementation, the timing data may include an indication of a position in time relative to an event or the capture of other source images. For example, the timing data may include, or be used to determine, a sequence or chronological order associated with a group of source images. The ordinal position of a source image within a sequence of source images may be referred to herein as an "index" associated with the source image.

Figure 3A:
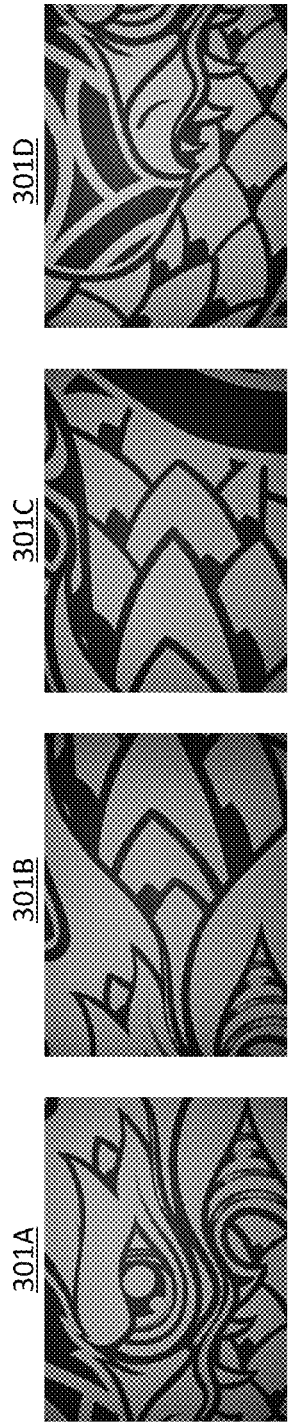
FIG. 3A depicts an illustration of four source images 301A-D having contiguous image content.

According to certain implementations, the sequence of image portion transitions in a panning or zooming effect may be based on timing data associated with the source images underlying a composite image. FIG. 3A depicts an illustration of four source images 301A-D having contiguous image content. In this example, the chronological order of the capture of the images is 301A-301B-301C-301D.

Figure 3B:
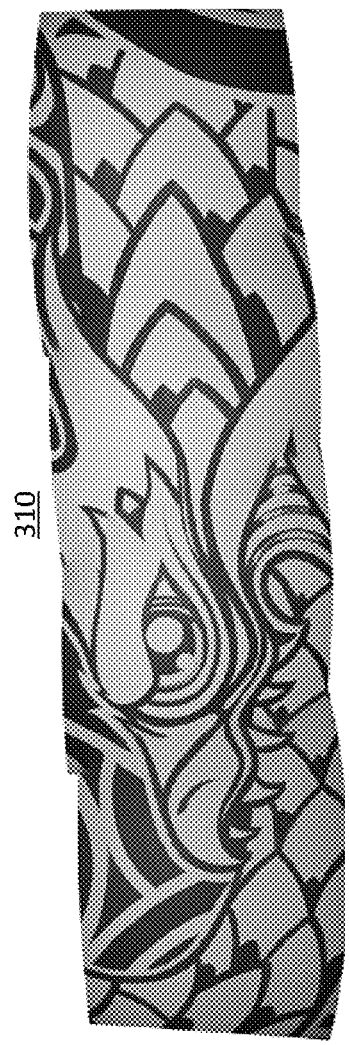
FIG. 3B depicts an illustration of an assembly 300 of the four source images 301A-D into a composite image 310.
Figure 3C:
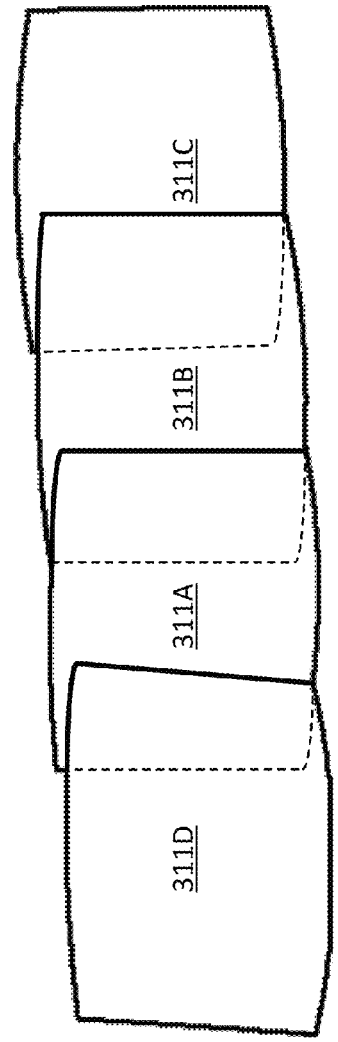
FIG. 3C depicts an illustration of regions 311A-D of the composite image 310 corresponding to the four source images 301A-D, respectively.

The source images may be used to create a composite image 310. FIG. 3B depicts an illustration of an assembly 300 of the four source images 301A-D into a composite image 310. As shown in FIG. 3B, although the chronological order associated with the source images corresponds to A-B-C-D, image 301D may be determined to share a contiguity, or overlap, with source image 301A. Accordingly, as shown in FIG. 3C, the portion 311D of composite image 310 corresponding to source image 301D is rendered adjacent to the portion 311A of the composite image corresponding to source image 301A, instead of adjacent to portion 311C.

According to certain implementations, a panning or zooming effect, such as the Ken Burns Effect, as applied to the composite image 310, may progress from a view of a portion 311A of the composite image corresponding to source image 301A to views of the portions 311B-D of the composite image corresponding to the other source images 301B-D. Thus, in an example implementation, the panning motion may mimic the movement of the image capture device while the source images 301A-D were being captured. In this example, because source image 301D shares a contiguity with source image 301A, but was captured after intervening source images 301B-C, the panning movement may change directions, based on the timing data, to place the corresponding portions of the composite image 310 in view according to chronological order.

According to certain implementations, various other characteristics of panning or zooming between portions of a composite image may be based on metadata generated during capture of the underlying source images. For example, a speed, acceleration, or direction of the panning movement may be based on sensor data recorded or generated during capture of the underlying source images. In some implementations, sensor data collected may be indicative of transitioning an image capture device between positions associated with capturing the plurality of source images. This data may be collected, by position or orientation sensors, such as accelerometers or gyroscopes; or by other means of determining position or orientation known in the art. Accordingly, when the corresponding composite image is viewed using a Ken Burns Effect or the like, the panning between various portions of the composite image can mimic the movement of the image capture device between positions associated with the capture of the source images. For example, if a user captured image 301B and then 301C in quick succession, but paused before capturing 301D, the panning motion could linger at the portion 311C of the composite image 310 corresponding to source image 301C before moving to the next portion.

According to certain implementations, various characteristics of zooming between portions of a composite image may be based on metadata generated during capture of the underlying source images. For example, the source images may be associated with varying levels of zoom, or focal lengths, as shown in FIG. 4. As a result, the size of the portion of a composite image corresponding to each source image may vary. Thus, zooming, or changing the dimensions of the viewing window, may be appropriate when progressing, for example, from a view of a portion of a composite image corresponding to source image 401A to a view of portion of the source image corresponding to source image 401B. In some implementations, the metadata may include an indication of a focal length associated with a source image or group of source images. The level of zoom while progressing between views of portions of the composite image may be automatically adjusted based this metadata. In another implementation, transitional zooming data between the capture of source photos may be recorded. The transitional zooming data may be used to mimic how a level of zoom was adjusted at an image capture device during capture of the source images.

According to certain implementations, the metadata associated with a source image may be stored in a same data file as the source image. For example, a time signature or index may be stored as metadata in an image file comprising or representing the source image. In another example, sensor data may be stored as metadata in the image file. In some implementations, a plurality of source images used to create a composite image, and sensor data indicative of transitioning an image capture device between positions associated with the capturing of source images, may be stored in a same file, or collection of related files. In yet another implementation, instructions based on the timing or sensor data and for implementing the panning or zooming effect, may be stored in a same file, collection of files, or in a database with one or more of the source images.

Figure 5:
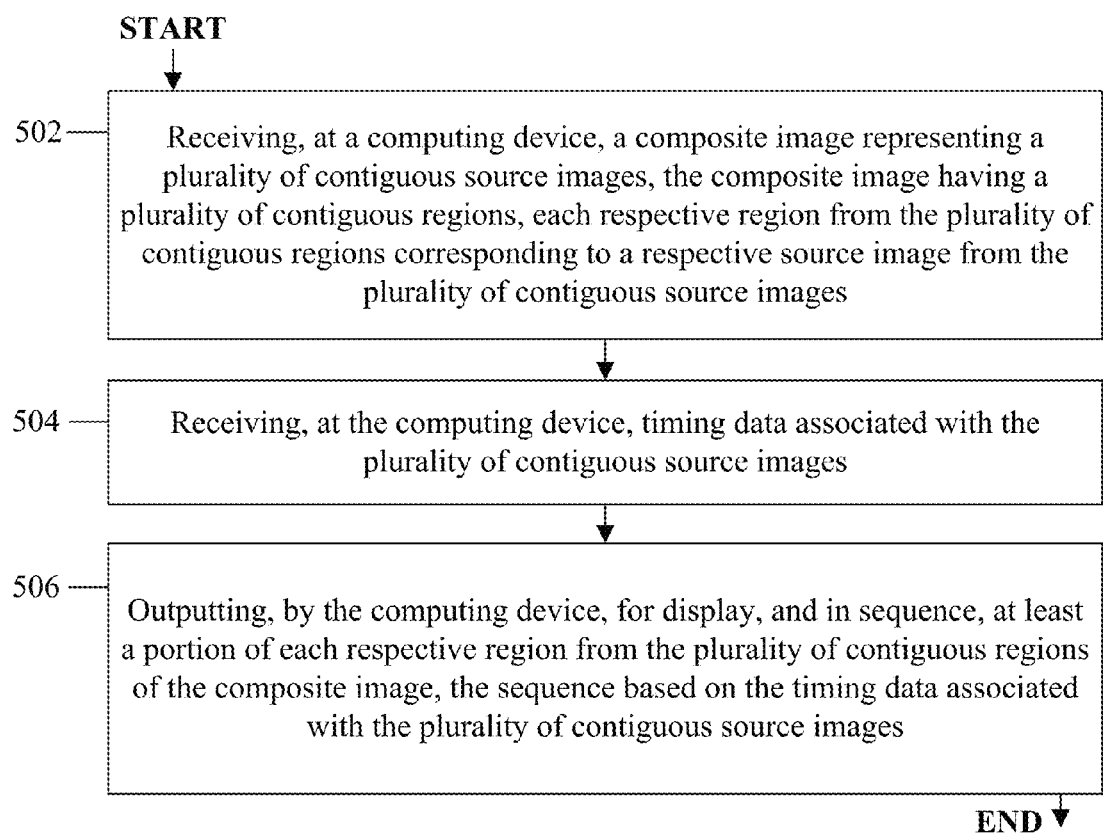
FIG. 5 is a flow diagram of a method 500 for animating a view of a composite image based on metadata related to the capture of the underlying source images.

FIG. 5 is a flow diagram of a method 500 for animating a view of a composite image based on metadata related to the capture of the underlying source images. As shown in FIG. 5, the method 500 starts in block 502, and, according to an example implementation, includes receiving, at a computing device, a composite image representing a plurality of contiguous source images, the composite image having a plurality of contiguous regions, each respective region from the plurality of contiguous regions corresponding to a respective source image from the plurality of contiguous source images. In block 504, the method 500 includes receiving, at the computing device, timing data associated with the plurality of contiguous source images. In block 506, the method 500 includes outputting, by the computing device, for display, and in sequence, at least a portion of each respective region from the plurality of contiguous regions of the composite image, the sequence based on the timing data associated with the plurality of contiguous source images.

FIG. 6 is a flow diagram of another method 600 for animating a view of a composite image based on metadata related to the capture of the underlying source images. As shown in FIG. 6, the method 600 starts in block 602, and, according to an example implementation, includes receiving, by the computing device, from the image capture device, a plurality of contiguous source images. In block 604, the method 600 includes defining, by the computing device, based on contiguities between the plurality of contiguous source images, a composite image representing the plurality of contiguous source images, the composite image having a plurality of contiguous regions, each respective region from the plurality of contiguous regions corresponding to a respective source image from the plurality of contiguous source images.

In block 606, the method 600 includes receiving, at the computing device, timing data associated with the plurality of contiguous source images. In block 608, the method 600 includes outputting, by the computing device, for display, and in sequence, at least a portion of each respective region from the plurality of contiguous regions of the composite image, the sequence based on the timing data associated with the plurality of contiguous source images.

It will be understood that the various steps shown in FIGS. 5 and 6 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method, comprising:
receiving, at a computing device, a composite image, the composite image being a single image formed from a plurality of source images, the composite image having a plurality of contiguous regions, each respective region from the plurality of contiguous regions corresponding to a respective source image from the plurality of source images, and the plurality of contiguous regions having fields of view that are overlapping or contiguous;
receiving, at the computing device, timing data associated with the plurality of source images; and
outputting, by the computing device, the composite image for display, the outputting comprising outputting, in a predefined sequence, at least a portion of each respective region from the plurality of contiguous regions of the composite image, the predefined sequence being based on the timing data associated with the plurality of source images.

2. The method of claim 1, wherein the timing data comprises, for each respective source image from the plurality of source images, a respective index from a plurality of indexes, wherein the predefined sequence is based on the plurality of indexes.

3. The method of claim 2, wherein each respective index from the plurality of indexes is based on a respective time of capture associated with the respective source image from the plurality of source images that is associated with the respective index.

4. The method of claim 1, wherein the composite image and the timing data are stored in a same data file.

5. The method of claim 1, wherein the outputting of the at least a portion of each respective region from the plurality of contiguous regions of the composite image comprises:
transitioning gradually from outputting a first region, from the plurality of contiguous regions of the composite image and corresponding to a first index in the predefined sequence, to outputting a second region, from the plurality of contiguous regions of the composite image corresponding to a next index in the predefined sequence, such that display of the first region pans across the composite image to display the second region.

6. The method of claim 5, further comprising:
receiving sensor data indicative of transitioning an image capture device between positions associated with capturing the plurality of source images,
wherein the transitioning gradually from outputting the first region to outputting the second region is based on the sensor data.

7. The method of claim 6, wherein the plurality of source images and the sensor data are stored in a same data file.

8. The method of claim 1, wherein:
a first source image, from the plurality of source images and corresponding to a first region from the plurality of contiguous regions, and a second source image, from the plurality of source images and corresponding to a second region from the plurality of contiguous regions, are associated with different focal lengths, and the outputting of the at least a portion of each respective region from the plurality of contiguous regions of the composite image comprises zooming from the first region, from the plurality of contiguous regions of the composite image and corresponding to a first position in the predefined sequence, to the second region from the plurality of contiguous regions of the composite image and corresponding to a next index in the predefined sequence, the method further comprising receiving focal length data associated with the plurality of source images.

9. The method of claim 1, wherein the plurality of source images are captured by an image capture device, the method further comprising:

defining, based on the contiguous regions between the plurality of source images, the composite image.

10. A computer program product comprising a non-transitory computer readable medium that stores instructions that, when executed by a computing device, cause the computing device to perform a method comprising:

receiving, at a computing device, a composite image, the composite image being a single image formed from a plurality of source images, the composite image having a plurality of contiguous regions, each respective region from the plurality of contiguous regions corresponding to a respective source image from the plurality of source images, and the plurality of contiguous regions having fields of view that are overlapping or contiguous;

receiving, at the computing device, timing data associated with the plurality of source images, the timing data comprising, for each respective source image from the plurality of source images, an indication of a respective time of capture associated with the respective source image; and outputting, by the computing device, the composite image for display, the outputting comprising outputting, in a predefined sequence, at least a portion of each respective region from the plurality of contiguous regions of the composite image, the predefined sequence being based on the timing data associated with the plurality of source images.

11. The computer program product of claim 10, wherein the composite image and the timing data are stored in a same location.

12. The computer program product of claim 10, wherein the outputting of the at least a portion of each respective region from the plurality of contiguous regions of the composite image comprises:

transitioning gradually from outputting a first region, from the plurality of contiguous regions of the composite image and corresponding to a first index in the predefined sequence, to outputting a second region, from the plurality of contiguous regions of the composite image corresponding to a next index in the predefined sequence, such that display of the first region pans across the composite image to display of the second region.

13. The computer program product of claim 12, the method further comprising:

receiving sensor data indicative of transitioning an image capture device between positions associated with capturing the plurality of source images, wherein the transitioning gradually from outputting the first region to outputting the second region is based on the sensor data.

14. The computer program product of claim 10, wherein the plurality of source images are captured by an image capture device, the method further comprising:

defining, based on the contiguous regions between the plurality of source images, the composite image.

15. A system comprising:

an image capture device operatively coupled to a computing device;

at least one memory operatively coupled to the computing device and configured for storing data and instructions that, when executed by the computing device, cause the computing device to perform a method comprising:

receiving, by the computing device, a plurality of source images captured by the image capture device;

defining, by the computing device, based on a plurality of contiguous regions between the plurality of source images, a composite image, the composite image being a single image formed from the plurality of source images, the composite image having the plurality of contiguous regions, each respective region from the plurality of contiguous regions corresponding to a respective source image from the plurality of source images, and the plurality of contiguous regions having fields of view that are overlapping or contiguous;

receiving, at the computing device, timing data associated with the plurality of source images; and outputting, by the computing device, the composite image for display, the outputting comprising outputting, in a predefined sequence, at least a portion of each respective region from the plurality of contiguous regions of the composite image, the predefined sequence being based on the timing data associated with the plurality of source images.

16. The system of claim 15, wherein the timing data comprises, for each respective source image from the plurality of source images, a respective index from a plurality of indexes, wherein the predefined sequence is based on the plurality of indexes.

17. The system of claim 16, wherein each respective index from the plurality of indexes is based on a respective time of capture associated with the respective source image from the plurality of source images that is associated with the respective index.

18. The system of claim 15, wherein the outputting of the at least a portion of each respective region from the plurality of contiguous regions of the composite image comprises:

transitioning gradually from outputting a first region, from the plurality of contiguous regions of the composite image and corresponding to a first position in the predefined sequence, to outputting a second region, from the plurality of contiguous regions of the composite image corresponding to a next position in the predefined sequence, such that display of the first region pans across the composite image to display the second region.

19. The system of claim 18, the method further comprising:

receiving sensor data indicative of transitioning an image capture device between positions associated with capturing the plurality of source images, wherein an acceleration or speed of the transitioning gradually from outputting the first region to outputting the second region is based on the sensor data.

20. The system of claim 15, wherein:

a first source image, from the plurality of contiguous source images and corresponding to a first region from the plurality of contiguous regions, and a second source image, from the plurality of source images and corresponding to a second region from the plurality of contiguous regions, are associated with different focal lengths, and the outputting of the at least a portion of each respective region from the plurality of contiguous regions of the composite image comprises transitioning gradually from outputting the first region, from the plurality of contiguous regions of the composite image and corresponding to a first position in the predefined sequence, to outputting the second region from the plurality of contiguous regions of the composite image and corresponding to a next position in the predefined sequence, such that display of the first region zooms to display of the second region;

the method further comprising receiving focal length data associated with the plurality of source images.

* * * * *